No. 735,554. PATENTED AUG. 4, 1903.
R. L. MILLER.
HANDLE FOR COAL BUCKETS OR OTHER VESSELS.
APPLICATION FILED MAR. 21, 1903.
NO MODEL.

Witnesses
G. Howard Walmsley.
Irvine Miller.

Inventor
Reuben L. Miller
By H. A. Toulmin
Attorney

No. 735,554. Patented August 4, 1903.

UNITED STATES PATENT OFFICE.

REUBEN L. MILLER, OF ENON, OHIO.

HANDLE FOR COAL-BUCKETS OR OTHER VESSELS.

SPECIFICATION forming part of Letters Patent No. 735,554, dated August 4, 1903.

Application filed March 21, 1903. Serial No. 148,830. (No model.)

*To all whom it may concern:*

Be it known that I, REUBEN L. MILLER, a citizen of the United States, residing at Enon, in the county of Clark and State of Ohio, have invented certain new and useful Improvements in Handles for Coal-Buckets or other Vessels, of which the following is a specification, reference being had therein to the accompanying drawings.

This invention relates to handles for coal-buckets and other vessels, and has for its object to provide a handle so constructed as to make the vessel carry evenly and prevent undue tilting of the vessel when loaded unevenly, while at the same time said handle will not interfere with the proper tilting of the vessel and the bringing of it into close proximity to the stove or other receptacle while being emptied.

To these ends my invention consists in certain novel features which I will now proceed to describe, and will then particularly point out in the claims.

Figure 1:
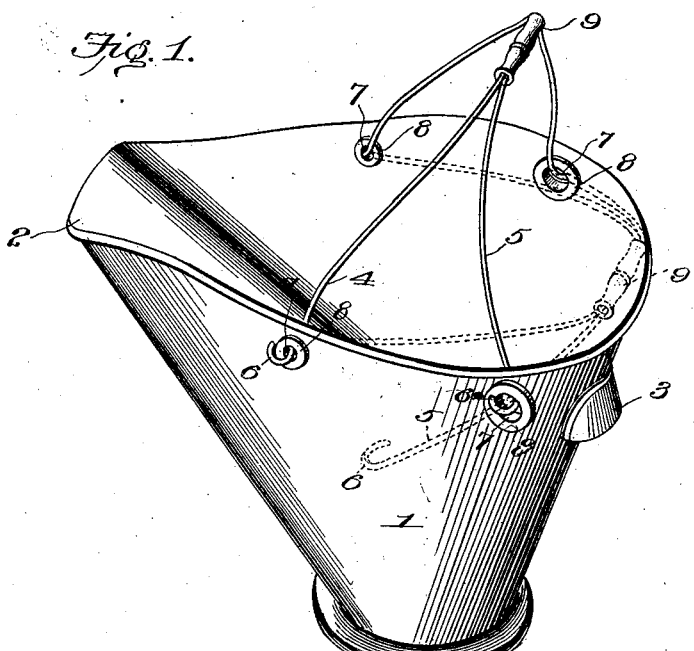
Figure 2:
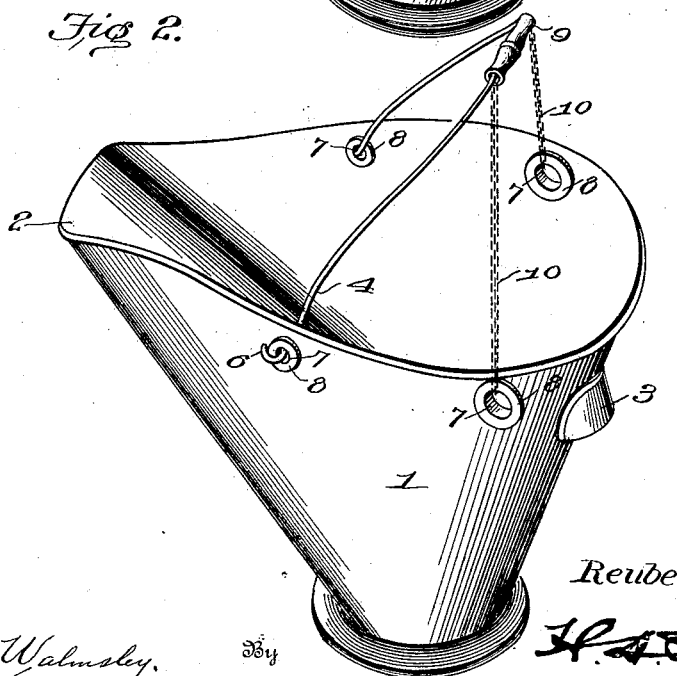

In the accompanying drawings, Figure 1 is a perspective view illustrating one form of my invention, and Fig. 2 is a similar view illustrating a modification thereof.

In said drawings, 1 indicates a coal-bucket of any approved construction having the usual discharge-spout 2 at one side and the hand-grasp 3 at the other side. To the upper portion of the bucket is connected my improved handle, which consists of two bails 4 and 5, preferably constructed of wire and having their lower ends pivotally connected to the bucket at separated points lying on opposite sides of the central transverse plane of the bucket. These pivotal connections are preferably effected by forming the lower ends of each bail into hooks 6, which pass through apertures 7 in the bucket, said apertures being preferably marginally strengthened by means of eyelets 8. The apertures through which the ends of the rear bail 5 pass are preferably sufficiently large to permit the lower bail to slide downward through said apertures on the exterior of the bucket. I also prefer to connect the upper parts of the two bails by means of a sleeve 9, apertured longitudinally for the passage of the bails and forming a handle proper or hand-grasp, by means of which both bails may be readily grasped.

It will be seen that since the two bails which form the handle are connected to the bucket on opposite sides of the central transverse plane thereof in which the normal center of gravity lies, while the upper parts of the bails are held together either by the hand of the user or by the sleeve 9, any tendency of the bucket to tilt unduly, owing to uneven loading, will be resisted by one bail or the other, as the case may be. When it is desired to throw the handle back, so as to permit the bucket to be titled forward and brought close to the stove or other receptacle, so as to discharge its load, the front bail 4 may be pressed downward and backward, the rear bail slipping down through the apertures 7, so that the parts will assume the position shown in dotted lines in Fig. 1. They may be readily brought back to their normal position (shown in full lines in Fig. 1) by pulling upward on the bails.

The rear bail need not necessarily be made of wire, as a flexible connection, such as the chain 10, (shown in Fig. 2,) may be employed to constitute the rear bail. This is possible because the greater portion of the load lies back of the point of connection of the front bail with the bucket, so that the rear bail is practically always under tension when the bucket is being supported by the handle alone.

It is obvious that various other modifications in the details of construction may be made without departing from the principle of my invention. For instance, although I deem the hand-grasp sleeve 9, which unites the upper ends of the bails, a desirable feature, it may be dispensed with. I therefore do not wish to be understood as limiting myself strictly to the precise details hereinbefore described, and shown in the accompanying drawings.

While I have described my invention as applied to a coal-bucket, to which it is particularly applicable, it is obvious that it is also applicable to other vessels.

Having thus fully described my invention, what I claim as new, and desire to secure by Letters Patent, is—

1. The combination, with a vessel-body, of a handle composed of two bails having their lower ends pivotally connected to the body on opposite sides of the central transverse plane thereof, the rear bail being yielding to permit the front bail to be swung downward and rearward toward the body, substantially as described.

2. The combination, with a vessel-body, provided with apertures arranged in pairs on opposite sides of the central transverse plane thereof, of a handle composed of two bails having terminal hooks to engage said apertures respectively, the rear apertures being adapted to permit the rear bail to slide downward therethrough, substantially as described.

3. The combination, with a vessel-body, provided with apertures arranged in pairs on opposite sides of the central transverse plane thereof, of a handle consisting of two bails having at their lower ends terminal hooks to engage said apertures respectively, the rear apertures being adapted to permit the rear bail to slide downwardly therethrough, and a hand-grasp sleeve through which the upper portions of both bails pass, substantially as described.

In testimony whereof I affix my signature in presence of two witnesses.

REUBEN L. MILLER.

Witnesses:
E. O. HAGAN,
IRVINE MILLER.